United States Patent [19]

Hochstein

[11] Patent Number: 4,713,583

[45] Date of Patent: Dec. 15, 1987

[54] HEADLAMP CLEANING SYSTEM

[76] Inventor: Peter A. Hochstein, 2966 River Valley Dr., Troy, Mich. 48098

[21] Appl. No.: 48,997

[22] Filed: May 8, 1987

Related U.S. Application Data

[63] Continuation of Ser. No. 904,617, Sep. 8, 1986, abandoned.

[51] Int. Cl.$^4$ .............................................. B60Q 1/02
[52] U.S. Cl. .................................. 315/82; 15/250 A; 307/10 LS; 315/77
[58] Field of Search ................ 315/82, 77; 15/250 A; 307/10 LS

[56] References Cited

U.S. PATENT DOCUMENTS

| | | | |
|---|---|---|---|
| 3,058,142 | 10/1962 | Pollock | 315/82 |
| 3,609,450 | 9/1971 | Hart | 315/82 |
| 3,963,969 | 6/1967 | Nottingham | 15/250 A |

*Primary Examiner*—Harold Dixon
*Attorney, Agent, or Firm*—Harold W. Milton, Jr.

[57] ABSTRACT

A vehicle headlamp cleaning assembly and method for use in a vehicle includes cleaning means (27) which are energized when the headlamps (10) collect residue. The headlamp (10) includes a transparent lens (12), a light source (14) and a housing (16) with a reflective interior surface (18). The assembly includes sensing means (20) within the housing (16) which sense the light source radiation generated by the light source (14) sensed by a first sensor (22) and the backscattered light radiation reflected off residue on the exterior surface of the lens (12) sensed by a second sensor (24). A control circuit (26) compares the light source radiation and the backscattered light radiation. When the amount of backscattered light radiation has exceeded a predetermined magnitude, the cleaning means (27) is actuated. The control circuit (26) includes a time delay means (30) which prevents the actuation of the cleaning means (27) until the predetermined magnitude of backscattered light radiation has existed for the time delay to prevent erratic operation and sensitivity to transient artifacts. The method of cleaning the headlamp (10) therefore includes the steps of sensing the amount of backscattered light radiation reflected from residue collected on the exterior of transparent lens (12) which decreases the light generated by the light source (14) and leaving the transparent lens (12). The cleaning means (27) is actuated in response to the amount of backscattered light exceeding a predetermined magnitude.

27 Claims, 2 Drawing Figures

HEADLAMP CLEANING SYSTEM

This application is a continuation of application Ser. No. 904,617, filed Sept. 8, 1986, now abandoned.

TECHNICAL FIELD

This invention relates to an assembly having a transparent lens with a light source therebehind within a housing to clean the lens when residue is sensed, and more particularly relates to a cleaning system for headlamps on a vehicle.

BACKGROUND ART

There is a need for headlamp cleaning systems on vehicles because headlamps collect light distorting residue. Dirty headlamps reduce visibility and cause a glare to on-coming traffic. Some systems activate a headlamp cleaning system whenever the windshield wiping assembly is activated. However, headlamps of a vehicle typically accumulate dirt faster than windshields. A problem arises in this type of system because neither the headlight cleaning system nor the windshield wiping system can be activated independently of the other. There are times when only the headlamp cleaning system or the windshield wiping system needs to be activated.

One type of assembly for independently activating a headlight cleaning system includes the use of photodiodes positioned on the exterior of a headlamp. The photodiodes will extend partially over the headlamp lens to receive light coming from behind the lens. When dirt or residue accumulates on the lens, less light will pass from the lens and thus less light will be sensed by the photodiodes. When a predetermined threshold is exceeded, the washing means is activated. A problem with this type of assembly is that the light sensor is mounted on the exterior of the headlamp which is subject to dirt and damage. The U.S. Pat. No. 3,609,450 granted Sept. 28, 1971 in the name of Atlee F. Hart discloses such a system where photodiodes sense the light coming through the lens from the light source to actuate a cleaning means when the sensed light falls below a predetermined magnitude.

SUMMARY OF THE INVENTION AND ADVANTAGES

The invention is a vehicle headlamp cleaning assembly and method for use in a vehicle which includes cleaning means which are energized when the headlamps collect residue. The assembly comprises a headlamp which includes a transparent lens with a light source therebehind and a housing having a reflective interior surface surrounding the light source and the transparent lens. The invention is characterized by sensing means within the housing for accomplishing the step of sensing the amount of backscattered light radiation reflected from residue collected on the exterior surface of the transparent lens and decreasing the amount of light radiation generated by the light source and leaving the transparent lens. A control means is responsive to the sensing means for accomplishing the step of actuating said cleaning means when the amount of said backscattered light exceeds a predetermined magnitude.

The present invention is an improvement over the prior art by sensing residue reflected light within the headlamp housing to eliminate any kind of external interference with the sensor.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
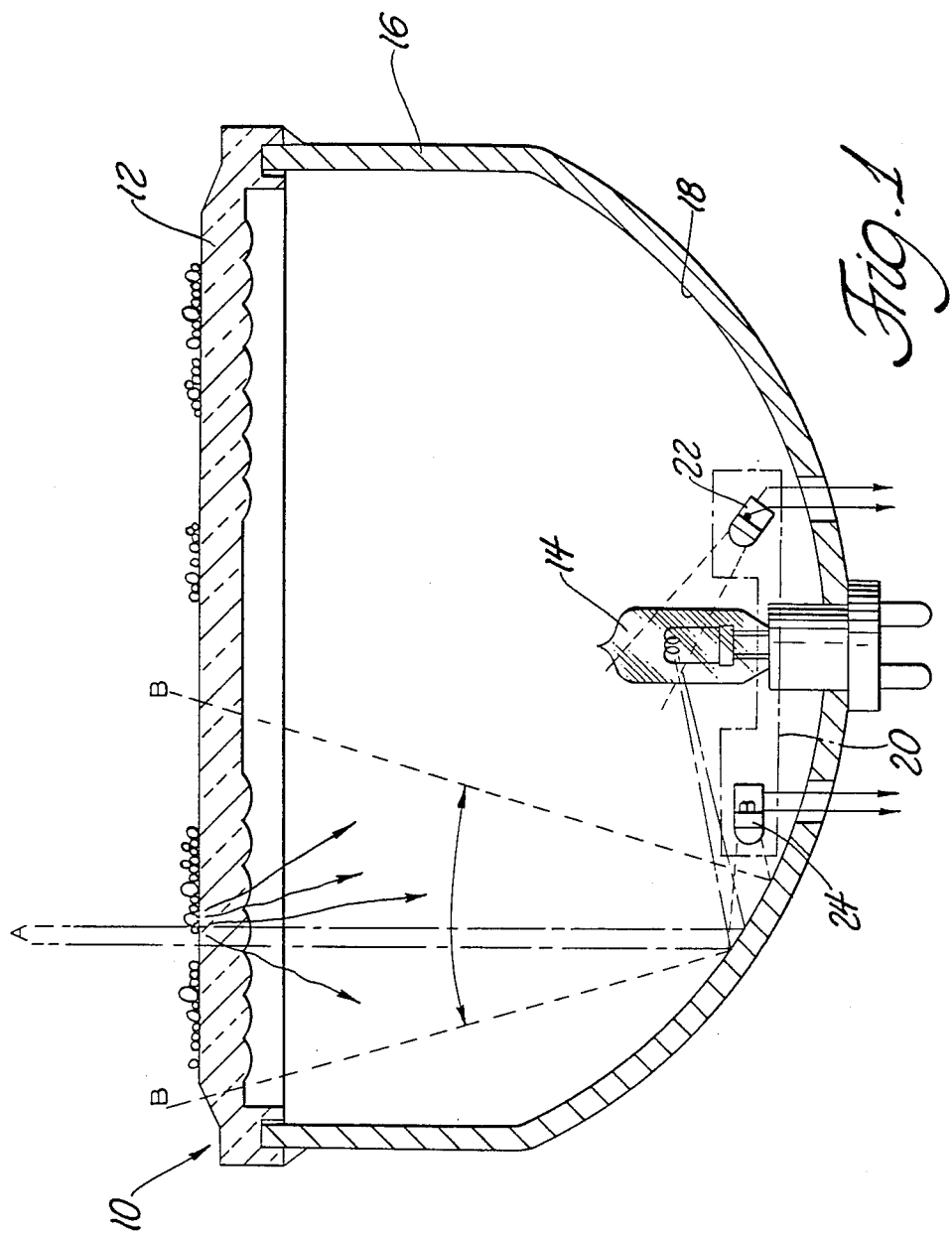
FIG. 1 is a partially broken away side view of the preferred embodiment of the subject invention.

The vehicle headlamp cleaning assembly for use in a vehicle includes a headlamp which is generally shown at 10 in FIG. 1. The headlamp 10 comprises a transparent lens 12 with a light source 14 therebehind. A housing 16 supports the light source 14 and the transparent lens 12 and has a reflective interior surface 18. The reflective interior surface 18 of the housing 16 is parabolic for reflecting light from the light source 14 out through and normal to the transparent lens. The assembly is characterized by sensing means 20 within the housing which senses the amount of backscattered light radiation from residue collected on the exterior surface of the transparent lens 12 and decreases the normal light radiation passing through the transparent lens 12 generated by the light source 14. The backscattered light radiation is a function of the reflective character of the residue and varies significantly with the residue composition.

The sensing means 20 includes a first sensor 22 directed towards the light source 14 which directly senses the amount of light source radiation generated by the light source 14. A second sensor 24 senses the amount of backscattered light radiation reflected back through the transparent lens 12 from the residue on the exterior surface of the lens 12. Road dirt forms an adherent optically absorbing film on the surface of the transparent lens 12, and some light radiation from the light source 14 is reflected and backscattered by the dirt particles. This backscattered radiation is collected by the reflective interior surface 18 and is reflected to the second sensor 24. The second sensor 24 is directed away from the light source and toward the reflective interior surface 18 to sense the backscattered light radiation reflected off the reflective interior surface 18. The absolute intensity of light entering the first sensor 22 is reduced to a level slightly higher than that normally entering the second sensor 24 by means of a pin hole aperture or filter, not shown.

Therefore, the first sensor 22 is primarily sensitive to change in lamp intensity, while the second sensor 24 is primarily sensitive to light entering the lens 12 from the outside. The absolute intensity of the backscattered light will vary with light radiation from the light source 14 because a small percentage of light radiation from the light source 14 will be sensed by the second sensor 24. Since the light source 14 is the primary source of illumination for the partially reflective dirt film, the absolute value of light intensity due to the light source 14 sensed by the first sensor 22 is substracted from the backscattered light radiation sensed by the second sensor 24 resulting in a measure of dirt film reflectivity.

The headlamp 10 in FIG. 1 illustrates the angles of light radiation (A,B). The angle of light radiation generated by the light source 14 is normal (A) to the lens 12 and is directly sensed by the first sensor 22. The angle of reflected light radiation (B) is at an angle other than normal to the lens 12 and is sensed by the second sensor 24.

Figure 2:
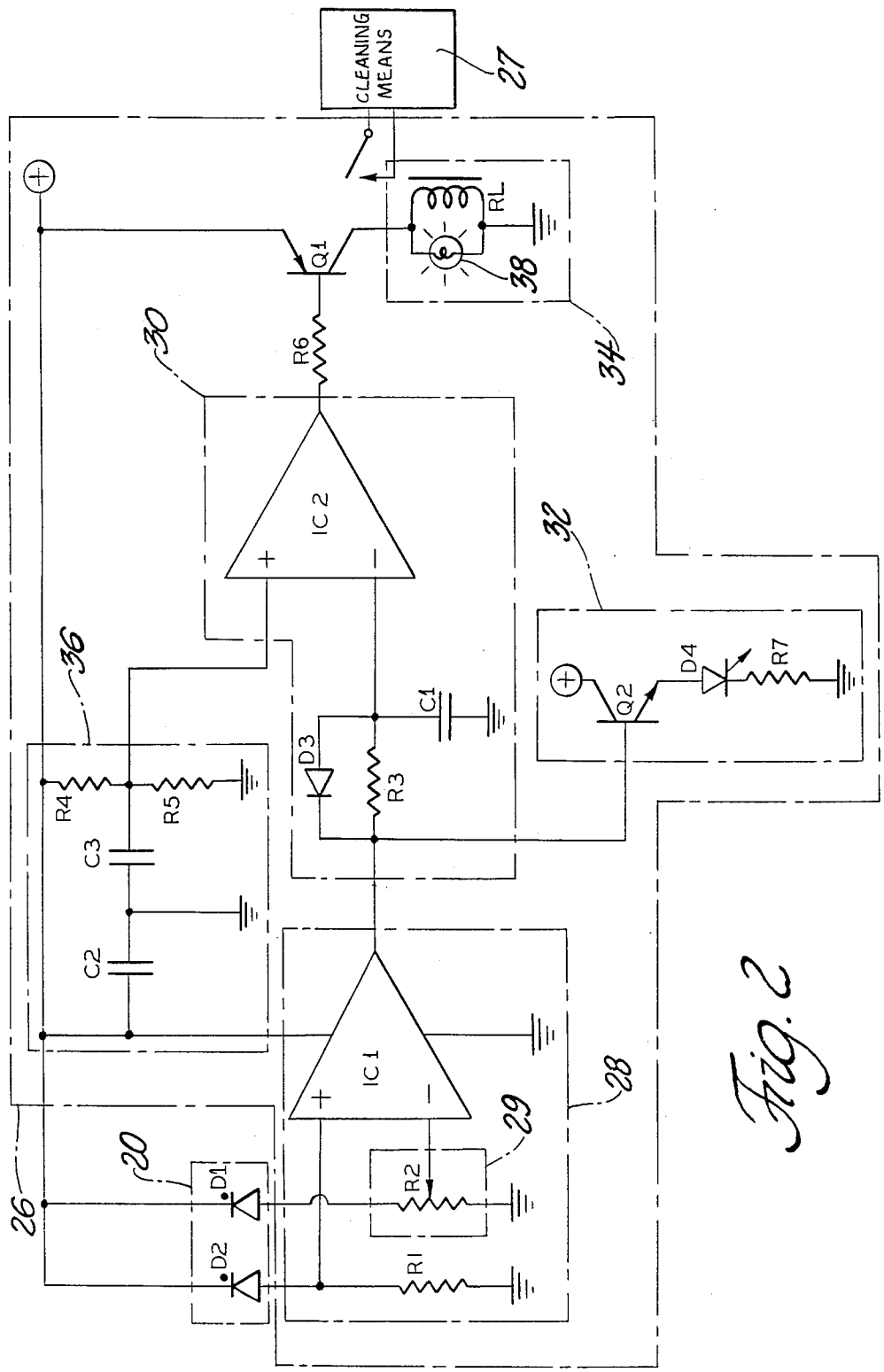
FIG. 2 is a circuit schematic of the control circuit of the subject invention.

The assembly also includes a control means, generally shown at 26 in FIG. 2, which is responsive to the sensing means 20 to actuate a cleaning means 27 when the amount of backscattered light radiation exceeds a predetermined magnitude. The control means 26 is connected to the first 22 and second 24 sensors by leads. The control means 26 includes a comparing means 28 which compares the light source radiation sensed by the first sensor 22 and the backscattered light radiation sensed by the second sensor. The comparing means 28 provides a start signal to actuate the cleaning means 27 when the amount of backscattered light radiation exceeds the predetermined magnitude. The comparing means 28 includes an adjustment means 29 to adjust the differential between the sensors 22, 24 to change the predetermined magnitude at which point the start signal is provided. In effect, the adjustable comparing means 28 establishes how much residue reflectivity is required to trigger the cleaning means 27. The predetermined magnitude incorporates the amount of light source radiation sensed by the first sensor 22 scaled by a factor determined by the adjustment means 29. The adjustment means 19 scales the predetermined magnitude and is made by a variable resistor R2 connected to the first sensor 22. Therefore, the voltage across the variable resistor R2 can be changed which results in a change in the predetermined magnitude of the comparator means 28.

The control means 26 also includes a time delay means 30 which prevents the actuation of the cleaning means 27 by the start signal until the predetermined magnitude of backscattered light radiation exists for a predetermined time delay. The time delay means 30 will prevent erratic operation of the control means 26 and prevent sensitivity to transient artifacts. Therefore, the differential between the sensors 22, 24 must exist for the predetermined time delay, i.e. 10 seconds, in order to energize the cleaning means 27.

The control means 26 further includes an indicator means 32 which provides a visual indication through a light emitting diode (L.E.D.) D4 of the existence of the start signal. The indicator means provides a visual reference during adjustment of the comparing means 28 to assists in the correct setting of the differential. Before installation within a vehicle, the comparator means 28 is adjusted by use of the indicator means 32 which will indicate the presence of the start signal after the time delay 30. A specific amount of residue may be put on the lens 12 and the variable resistor R2 can be adjusted until the indicator means 32 lights the L.E.D. D4. When using this assembly in the further, the cleaning means 27 will be energized when residue has collected which is approximately equal to the adjusted residue amount.

The control means 26 includes a relay means 34 for energizing the cleaning means 27 in response to a start signal. After the time delay, the signal will be sent to the relay means 34 which will switch on the cleaning means 27.

A power supply means 36 is used to deliver power to the assembly to protect the assembly from power surges and to limit the amount of voltage to required ranges.

As shown in FIG. 2, the sensor means 22, 24 and the control means 26 may be schematically implemented as follows. The first 22 and second 24 sensors are photodiodes D1, D2. The adjustable comparing means 28 includes a first operational amplifier IC1 with the non-inverting input connected to the second photodiode D2 and a first bias resistor R1 for biasing. The inverting input is connected to the first photodiode D1 and the variable resistor R2 for biasing. The variable resistor R2 is adjustable to change the differential between the sensors 22, 24 at which the start signal is provided. The time delay means 30 includes a first limiting resistor R3, a time delay capacitor C1 and a discharge diode D3 connected in parallel which are connected to the output of the first operational amplifier IC1. A second operational amplifier IC2 has the inverting input biased by the time delay capacitor C1 and the first limiting resistor R3. The non-inverting input is biased by the power supply means 36. The power supply means 36 includes first C2 and second C3 parallel capacitors connected to parallel second R4 and third R5 limiting resistors. The second resistor R4 is connected to a voltage source and the third resistor R5 is connected to ground. The control means 26 includes a first transistor Q1 with the base biased by a fourth limiting resistor R6 which is connected to the output of the second operational amplifier IC2. The emitter of the second transistor Q1 drives an indicator lamp 38 and a relay RL of the relay means 30. The indicator means 32 includes a second transistor Q2 with a base connected to the output of the first operational amplifier IC1 and the emitter connected to the L.E.D. D4 which is connected to ground by a fifth limiting resistor R7.

The general operation of the control means 26 is as follows. The first D1 and second D2 photodiodes are reversed biased by the power supply means 36 and leakage current develops a voltage across the first bias resistor R1 and the variable resistor R2. The normal, or clean lens, output of the second sensor 24 is about 10% higher than the output of the first sensor 22. This absolute sensitivity is established by the use of the pin hole aperture on the second sensor 24, not shown. The comparing means 28, or the first operational amplifier IC1, will change states when ever the non-inverting input exceeds the inverting input voltage. The variable resistor R2 is used as a voltage divider and allows the voltage at the inverting input to be set at any practical level. This adjustability adjusts the predetermined magnitude to change the output of the comparing means 28 from low to high. The time delay means 30 prevents erratic operation and sensitivity to transient artifacts through the RC time delay 30. The time delay capacitor C1 is charged whenever the output of the first operational amplifier IC1 goes high. The charging takes place through first limiting resistor R3, thereby instituting the delay. The setpoint voltage for the second operational amplifier IC2 is one-half the supply voltage, and is established by resistor dividers R4, R5. Whenever the voltage at the time delay capacitor C1 and thus the inverting input of the second operational amplifier IC2 equals or exceeds the reference voltage at the non-inverting input of the second operational amplifier IC2, the output of the second operational amplifier IC2 goes from high to low. The discharge diode D3 allows the time delay capacitor C1 to discharge quickly through the comparing means 28 whenever the output goes low, thus resetting the time delay means 30. The first transistor Q1 is connected as an emitter follower and drives the rely RL through the fourth limiting resistor R6. The first C2 and second C3 parallel capacitors are bypass AC decoupling capacitors and act as filters on the power supply lines. The relay RL and the lamp 38 are energized after approximately 10 seconds of a high signal output from the first operational amplifier IC1.

The following are values for the various components which may be used in a circuit made in accordance with the subject invention, it is to be understood that the values are exemplary and various combinations of value may be used in the various components utilized in practicing the invention.

| LIST OF COMPONENTS | |
| --- | --- |
| Resistors | Value |
| R1 | 10K ohms |
| R2 | 10K ohms |
| R3 | 1M ohms |
| R4 | 47K ohms |
| R5 | 47K ohms |
| R6 | 1.5K ohms |
| R7 | 470 ohms |
| Capacitors | Value |
| C1 | 10 uf |
| C2 | 1 uf |
| C3 | .1 uf |
| Op Amps | Type |
| IC1, IC2 | LM358 |
| Transistors | Type |
| Q1 | 2N3906 |
| Q2 | 2N3904 |

In accordance with the subject invention, there is provided a method for cleaning headlamps of the type including a light source behind the transparent lens 12 and adjacent a reflective interior surface 18. The amount of backscattered light radiation reflected from residue collecting on the exterior surface of the lens 12 and decreasing the normal light radiation passing through the lens 12 generated by the light source 14 is sensed. The cleaning means 27 is actuated when the amount of backscattered light radiation exceeds a predetermined magnitude.

To measure the amount of backscattered light radiation, the amount of light source radiation directly generated by the light source 14 is sensed. Concurrently, the amount of backscattered light radiation reflected off residue on the exterior of the lens 12 is sensed. The amount light source radiation and backscattered light radiation is compared which actuates the cleaning means 27 when the amount of backscattered light radiation exceeds the predetermined magnitude.

The actuation of the cleaning means 27 is time delayed 30 until the predetermined magnitude of backscattered light radiation exists for a predetermined time delay to prevent erratic operation and sensitivity.

The invention has been described in an illustrative manner, and it is to be understood that the terminology which has been used in intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A vehicle headlamp assembly for use in a vehicle to indicate when the headlamps collect residue, said assembly comprising; a headlamp (10) including a transparent lens (12) with a light source (14) therebehind and a housing (16) having a reflective interior surface (18) about said light source (14) and said transparent lens (12), said assembly characterized by sensing means (20) within said housing (16) for sensing the amount of backscattered light radiation reflected from residue collected on the exterior of said transparent lens (12) and decreasing the amount of light radiation generated by said light source (14) and leaving said transparent lens (12), and control means (26)

responsive to said sensing means (20) for indicating when said amount of said backscattered light exceeds a predetermined magnitude.

2. An assembly as set forth in claim 1 further characterized by said sensing means (20) including a first sensor (22) directed toward said light source (14) for directly sensing the amount of light source radiation generated by said light source (14).

3. An assembly as set forth in claim 2 further characterized by said sensing means (20) including a second sensor (24) for sensing the amount of backscattered light radiation reflected back through said transparent lens (12) from the residue on said exterior surface of said lens (12).

4. An assembly as set forth in claim 3 further characterized by said control means (26) including a comparing means (28) for comparing said first and second sensors and providing a start signal for indicating when the amount of said backscattered light radiation exceeds said predetermined magnitude.

5. An assembly as set forth in claim 4 wherein said second sensor (24) is directed away from said light source (14) and toward said reflective interior surface (18) for sensing said backscattered light radiation after its reflected off said reflective interior surface (18).

6. An assembly as set forth in claim 5 further characterized by said control means (26) including time delay means (30) for preventing said start signal until said predetermined magnitude of said residue reflectively exists for a predetermined time delay.

7. An assembly as set forth in claim 6 further characterized by said comparing means (28) including adjustment means (29) for adjusting the differential between said sensors (22, 24) to change said predetermined magnitude at which said start signal is provided.

8. An assembly as set forth in claim 7 further characterized by said control means (26) further including a indicator means (32) for providing a visual indication of the existence of the start signal to provide a reference during adjustment of said comparing means (28) to change said differential.

9. An assembly as set forth in claim 7 further characterized by including cleaning means (27), and said control means (26) including relay means (34) for activating said cleaning means (27) in response to said start signal and indicator lamp (38) for indicating the presence of said start signal.

10. An assembly as set forth in claim 7 further characterized by said control means (26) including a power supply means (36) for delivering power to said assembly and for protecting said assembly from power surges.

11. An assembly as set forth in claim 10 further characterized by said first (22) and said second (24) sensors being photodiodes (D1, D2).

12. An assembly as set forth in claim 11 further characterized by said adjustable comparing means (28) including a first operational amplifier (IC1) with a non-inverting input connected to said second photodiode (D2) with a first bias resistor (R1) for biasing and an inverting input connected to said first photodiode (D1) with a variable resistor (R2) for biasing, said variable resistor (R2) being adjustable to change the differential between said sensors (22, 24) at which said start signal is provided.

13. An assembly as set forth in claim 11 further characterized by said time delay means (30) including a first limiting resistor (R3) and a discharge diode (D3) connected in parallel with each other and in series with the output of said first operational amplifier (IC1) and a time delay capacitor (C1) connected to the output of said parallel first limiting resistor (R3) and said discharge diode (D3), a second operational amplifier (IC2) with the inverting input biased by said time delay capacitor (C1) and said first limiting resistor (R3), and the non-inverting input biased by said power supply means (36).

14. An assembly as set forth in claim 13 further characterized by indicator means (32) for providing a visual indication of the existence of the start signal to provide a reference during adjustment of said comparing means (28) to change said differential, said indicator means (32) including a second transistor (Q2) with the base connected to the output of said first operational amplifier (IC1) or said adjustable comparing means (28) and the emitter connected to a light emitting diode (D4), and a fifth limiting resistor (R7) connected to said light emitting diode (D4).

15. An assembly as set forth in claim 14 further characterized by said power supply means (36) including a first parallel capacitor (C2) in parallel with a second parallel capacitor (C3) connected to a second limiting resistor (R4) connected to a voltage source and a third limiting resistor (R5) connected to ground.

16. An assembly as set forth in claim 15 further characterized by said control means (26) including a first transistor (Q1) with the base biased by a fourth limiting resistor (R6) connected to the output of said second operational amplifier (IC2)

17. An automatic control assembly for use in combination with a light source (14) behind a transparent lens (12) and adjacent a reflective interior surface (18) for sensing when the lens (12) has collected light distorting residue said assembly comprising; sensing means (20) for sensing the amount of backscattered light radiation reflected from residue collected on the exterior of the transparent lens (12) and decreasing the light radiation generated by the light source (14) and leaving the transparent lens (12), and control means (26) for indicating when said amount of residue reflectivity has exceeded a predetermined magnitude.

18. An assembly as set forth in claim 17 further characterized by said sensing means (20) including a first sensor (22) directed toward said light source (14) for directly sensing the amount of light source radiation generated by said light source (14).

19. An assembly as set forth in claim 18 further characterized by said sensing means (20) including a second sensor (24) for sensing the amount of backscattered light radiation reflected back through said transparent lens (12) from the residue on said exterior surface of said lens (12).

20. An assembly as set forth in claim 19 further characterized by said control means (26) including a comparing means (28) for comparing said first and second sensors and providing a start signal to indicate
    when the amount of said backscattered light radiation exceeds said predetermined magnitude.

21. An assembly as set forth in claim 20 wherein said second sensor (24) is directed away from said light source (14) and toward said reflective interior surface (18) for sensing said backscattered light radiation after its reflected off said reflective interior surface (18).

22. A method of sensing residue on the lens (12) of a vehicle headlamp of the type including a light source (14) behind the transparent lens (12) and adjacent a reflective interior surface (18), said method comprising the steps of; sensing the amount of backscattered light radiation reflected from residue on the exterior surface of the lens (12) and decreasing the amount of light radiation generated by the light source and leaving the lens (12), and indicating when the amount of backscattered light exceeds a predetermined magnitude.

23. A method as set forth in claim 22 further including sensing the amount of light source radiation directly generated by the light source (14).

24. A method as set forth in claim 23 further including sensing the backscattered light radiation reflected back through the lens (12) from the residue on the exterior surface of the lens (12).

25. A method as set forth in claim 24 further including comparing the backscattered light radiation and the light source radiation to indicate when said amount of backscattered light exceeds the predetermined magnitude.

26. A method as set forth in claim 25 further including delaying the indication until the predetermined magnitude of backscattered light exists for a predetermined time delay.

27. An assembly as set forth in claim 26 further characterized by energizing an indicator lamp (38) for indicating the presence of said start signal.

* * * * *